United States Patent
Kuriya et al.

(10) Patent No.: US 6,985,171 B1
(45) Date of Patent: Jan. 10, 2006

(54) IMAGE CONVERSION DEVICE FOR VEHICLE REARWARD-MONITORING DEVICE

(75) Inventors: Hisashi Kuriya, Aichi-ken (JP); Kazunori Shimazaki, Aichi-ken (JP); Tomohiro Uda, Aichi-ken (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 372 days.

(21) Appl. No.: 09/856,921

(22) PCT Filed: Sep. 22, 2000

(86) PCT No.: PCT/JP00/06523

§ 371 (c)(1),
(2), (4) Date: Sep. 10, 2001

(87) PCT Pub. No.: WO01/24527

PCT Pub. Date: Apr. 5, 2001

(30) Foreign Application Priority Data

Sep. 30, 1999 (JP) ................................. 11-279197
Dec. 28, 1999 (JP) ................................. 11-372170

(51) Int. Cl.
*H04N 7/18* (2006.01)
(52) U.S. Cl. .................. 348/148; 348/151; 348/149; 348/207; 348/118; 340/435; 340/436; 396/419
(58) Field of Classification Search ............... 348/148, 348/149, 118, 151, 207; 340/435, 436; 396/419
See application file for complete search history.

(56) References Cited

U.S. PATENT DOCUMENTS

| | | | | |
|---|---|---|---|---|
| 5,121,200 A | * | 6/1992 | Choi | 348/148 |
| 5,289,321 A | * | 2/1994 | Secor | 348/118 |
| 6,259,359 B1 | * | 7/2001 | Fujinami et al. | 340/435 |

FOREIGN PATENT DOCUMENTS

| | | | | |
|---|---|---|---|---|
| JP | 01147983 A | * | 6/1989 | |
| JP | 01147983 A | * | 9/1989 | |
| JP | 3-99952 | | 4/1991 | |
| JP | 3-99952 A | * | 4/1991 | |
| JP | 07-186833 | | 7/1995 | |
| JP | 08-096118 | | 4/1996 | |
| JP | 10271490 A | * | 9/1998 | |
| JP | 10-271490 | | 10/1998 | |
| JP | 11-016097 | | 1/1999 | |
| JP | 11016097 | * | 1/1999 | |

* cited by examiner

Primary Examiner—Shawn S. An
(74) Attorney, Agent, or Firm—Morgan & Finnegan, LLP

(57) ABSTRACT

An image transformation apparatus for a vehicle rear monitoring device uses a transformation table to transform an image of the rear of a vehicle captured by a camera mounted on the vehicle for capturing the rear of the vehicle into an output image assumed to be obtained by capturing the rear at a predetermined inclination from a virtual camera position different from an actual camera position at which the camera is mounted, and displays the output image on the monitor 4. Furthermore, the output image may be displayed on the monitor 4, with a steering start guideline, a steering amount guide mark, a vehicle width guideline, and a vehicle path guideline superimposed thereon.

11 Claims, 10 Drawing Sheets

VIRTUAL CCD SURFACE COORDINATE SYSTEM

ON PLANE $PL_B$

GROUND COORDINATE SYSTEM B

GROUND COORDINATE SYSTEM A

ON PLANE PLA

ACTUAL CCD SURFACE COORDINATE SYSTEM

ACTUAL CCD SURFACE COORDINATE SYSTEM

IMAGE CONVERSION DEVICE FOR VEHICLE REARWARD-MONITORING DEVICE

TECHNICAL FIELD

The present invention relates to an image transformation apparatus for use in a vehicle rear monitoring device, for displaying an image of the rear of a vehicle captured by a camera on a monitor screen at a driving seat, thereby ensuring higher safety at a time when the vehicle is rolling backward.

BACKGROUND ART

Conventionally, in order to handle a situation in which a driver cannot see a place of interest due to a blind spot of a vehicle at a time when the vehicle is rolling backward, an image apparatus has been proposed, in which a rear view of a vehicle captured by a camera disposed at the rear of the vehicle is displayed on a monitor at a driving seat.

As shown in FIG. 11, a camera 2 for capturing a rear view of a vehicle 1 is attached to a position at a height h in the vicinity of a number plate 6 at the rear of the vehicle 1. The camera 2 is equipped with a lens and a CCD (not shown), and an image of the rear of the vehicle 1 is captured onto a CCD surface via the lens. A monitor 4 made of a color-type liquid crystal display is disposed at a driving seat of the vehicle 1, and when a shift lever 5 provided at the driving seat is shifted to a backward position, an image captured by the camera 2 is displayed on the monitor 4.

In the above-mentioned apparatus, an image of a road condition and the like at the rear of a vehicle when the vehicle is rolling backward is displayed on a screen of the monitor 4. Therefore, a driver can confirm a rear view by watching the screen of the monitor 4, and then, allow the vehicle to roll backward.

Herein, as shown in FIG. 11, a ground coordinate system is assumed on the ground 10 in which a crossing point between a ground 10 and a camera optical axis 7 that is the center of image-capturing of the camera 2 is an origin O, the rear side of the vehicle 1 is a Y-axis positive direction, and the left side of the vehicle 1 is an X-axis positive direction. A grid line 11 is also assumed on the ground 10, in which lines parallel to the X-axis and the Y-axis are arranged in a grid shape. An image of the grid line 11 captured by the camera 2 on the CCD surface of the camera 2 is as shown in FIG. 12. The image on the CCD surface is displayed on the monitor 4.

However, the camera 2 is mostly attached at a relatively low position in the vicinity of the number plate 6, considering the appearance of the vehicle from its rear side. Accordingly, in the case where the camera is attached at a low position, if an image captured by the camera 2 is displayed on the monitor 4 as it is, a viewpoint of a rear view seen from the screen of the monitor 4 is close to the ground 10, resulting in an image that is difficult to see by human eyes.

Furthermore, when the vehicle is moving, an image movement speed is varied between a region close to the vehicle and a region away from the vehicle on the image of the monitor 4, as shown in FIG. 12, which results in a difficult-to-see image.

Furthermore, as shown in FIG. 12, an image contains lens distortion. Therefore, a straight line drawn on the ground 10 looks like a curved line, which results in a further difficult-to-see image.

On the other hand, the camera 2 cannot be attached in such a manner as to obtain a monitor image from a viewpoint at a position of a rear window 8 of the vehicle 1. Therefore, an image cannot be obtained from such a viewpoint.

DISCLOSURE OF INVENTION

The present invention has been achieved in order to solve the above-mentioned problems, and its object is to provide an image transformation apparatus for a vehicle rear monitoring device that allows a driver to easily see an image at the rear of the vehicle when the vehicle is rolling backward, irrespective of a camera attachment position.

The image transformation apparatus for a vehicle rear monitoring device according to the present invention includes: a camera mounted at a vehicle for capturing the rear of the vehicle; a monitor disposed at a driving seat of the vehicle; and display control means for transforming an input image that is an image captured by a camera at a time when the vehicle is rolling backward into an output image that is an image assumed to be obtained by capturing the rear at a predetermined inclination from a virtual camera position different from an actual camera position at which the camera is mounted.

BEST MODE FOR CARRYING OUT THE INVENTION

Hereinafter, the present invention will be described by way of embodiments of an image transformation apparatus for a vehicle rear monitoring device with reference to the accompanying drawings.

Embodiment 1

Figure 1:
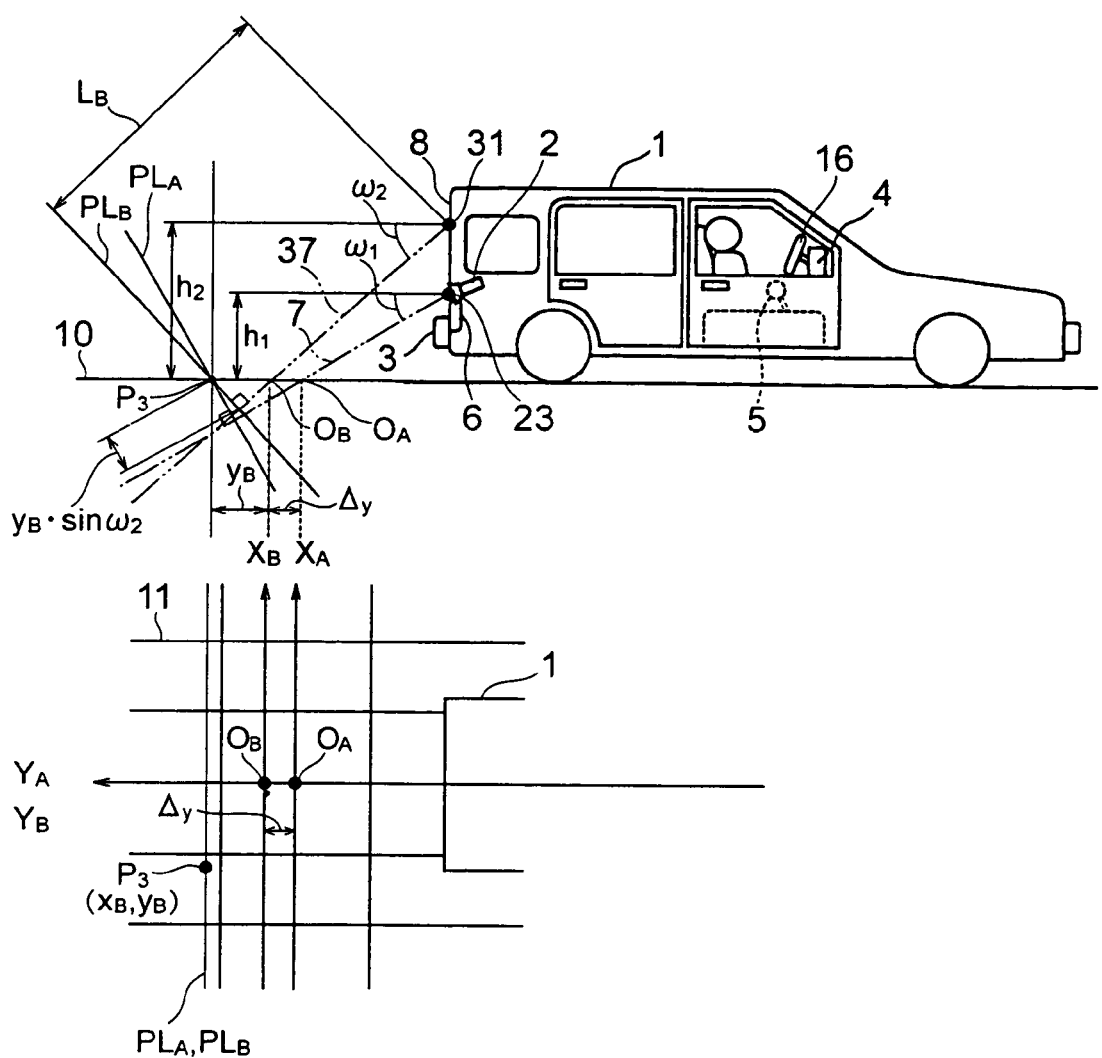
FIG. 1 is a diagram showing a vehicle equipped with an image transformation apparatus for a vehicle rear monitoring device of Embodiment 1 according to the present invention.

As shown in FIG. 1, in a rear portion of a vehicle 1, a camera 2 for capturing the rear of the vehicle 1 is mounted at an inclination $\omega_1$ at an actual camera position 23 with a height $h_1$ in the vicinity of a number plate 6 disposed on an upper portion of a rear bumper 3. A monitor 4 made of a color-type liquid crystal display is disposed at a driving seat of the vehicle 1. Furthermore, the vehicle 1 is equipped with a controller (not shown), and a steering wheel 16 and a shift lever 5 for instructing the vehicle 1 to roll backward are provided at the driving seat.

Furthermore, reference numeral 7 denotes a camera optical axis that is the center of image-capturing of the camera 2, and a crossing point between a ground 10 and the camera optical axis 7 is represented by an actual camera optical axis center $O_A$. Furthermore, on a rear window 8, a virtual camera position 31 only height of which is different from that of the actual camera position 23 is assumed at a height $h_2$. Reference numeral 37 denotes a virtual camera optical axis that is a camera optical axis when it is assumed that the camera 2 is disposed at the virtual camera position 31 at an inclination $\omega_2$. A crossing point between the ground 10 and the virtual camera optical axis 37 is represented by a virtual camera optical axis center $O_B$.

Furthermore, a plane $PL_A$ represents a plane vertical to the camera optical axis 7, containing an arbitrary point $P_3$ on the ground. A plane $PL_B$ represents a plane vertical to the virtual camera optical axis 37, containing an arbitrary point $P_3$.

Figure 2:
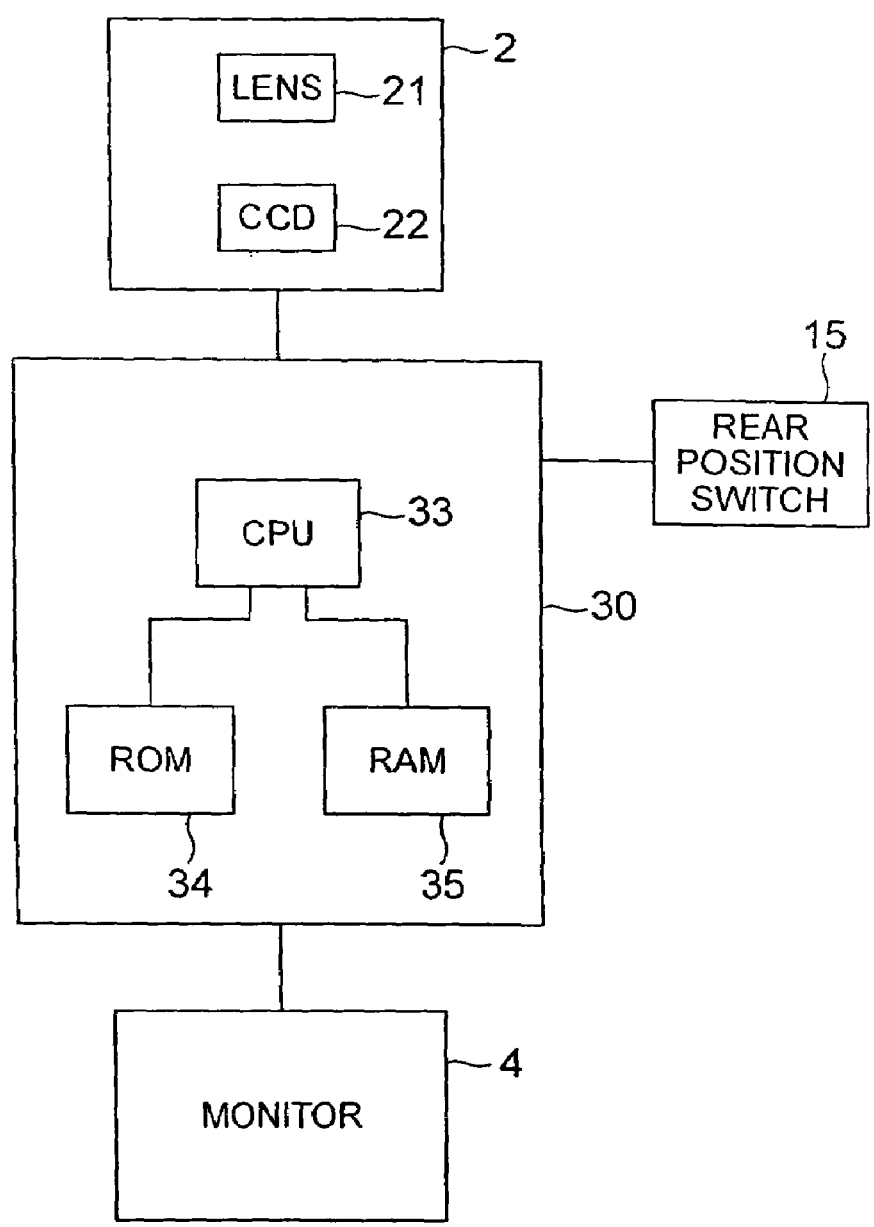
FIG. 2 is a block diagram showing a constitution of the image transformation apparatus of Embodiment 1.

FIG. 2 shows a constitution of the image transformation apparatus for a vehicle rear monitoring device of Embodiment 1 according to the present invention.

The camera 2 includes a lens 21 and a CCD (charge-coupled device) 22. The camera 2 is connected to a controller 30 that is display control means, and in turn, the controller 30 is connected to a monitor 4. Furthermore, the vehicle 1 is provided with a rear position switch 15 for detecting whether or not the shift lever 5 is switched to a backward position. The rear position switch 15 is connected to the controller 30. Furthermore, the controller 30 includes a CPU 33 for processing image transformation, a ROM 34 storing a control program, and an operational RAM 35 for temporarily storing input image data from the camera 2 and output image data to be displayed on the monitor 4.

The controller 30 is operated based on the control program. Upon detecting that the shift lever 5 is switched to a backward position by the rear position switch 15, the controller 30 performs image transformation processing with respect to an input image containing lens distortion, captured by the camera 2 and taken into the surface of the CCD 22, using a transformation table. In this manner, the input image is transformed into an output image that is assumed to be obtained by three-dimensionally capturing the rear from the virtual camera position 31, and the output image is displayed on the monitor 4.

Next, processing of transforming an input image captured by the camera 2 into an output image to be displayed on the monitor 4 will be described.

First, as shown in FIG. 1, a ground coordinate system A is assumed on the ground 10 in which the actual camera optical axis center $O_A$ is an origin, the rear side of the vehicle 1 is a $Y_A$-axis positive direction, and the left side of the vehicle 1 is an $X_A$-axis positive direction. A ground coordinate system B is also assumed on the ground 10 in which the virtual camera optical axis center $O_B$ is an origin, the rear side of the vehicle 1 is a $Y_B$-axis positive direction, and the left side of the vehicle 1 is an $X_B$-axis positive direction. Furthermore, for convenience of description of an image display on the monitor 4, a grid line 11 is assumed on the ground 10 in which lines parallel to the $X_A$-axis and the $Y_A$-axis are formed in a grid shape. Furthermore, $P_3$ represents a point on the ground 10 used for describing creation of a transformation table.

Figure 5A:
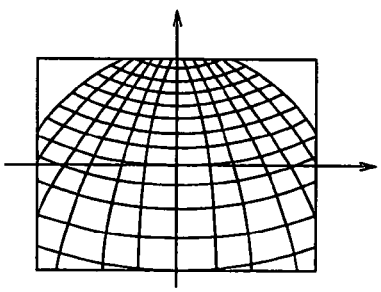
FIG. 5A is a schematic diagram illustrating the effects of image transformation of the image transformation apparatus of Embodiment 1, i.e., a diagram showing an input image containing lens distortion.

As shown in FIG. 5A, an input image taken into the CCD 22 surface contains lens distortion, and is input to the controller 30.

In the controller 30, the input image is subjected to an arithmetic operation based on a transformation table (described later) so as to be transformed into an output image without lens distortion.

Hereinafter, a method for creating a transformation table will be described.

The transformation table is used for searching for pixels of an input image at the actual camera position 23, which correspond to pixels of an output image assumed to be obtained by virtually capturing the rear from the virtual camera position 31.

First, in an output image, coordinates on the ground coordinate system B are determined, which correspond to those of pixels on the virtual CCD surface coordinate system at the virtual camera position 31 (Step 1).

Figure 3A:
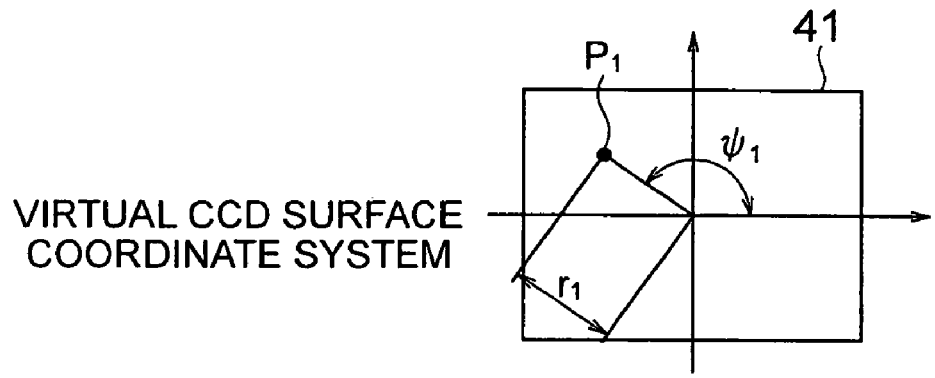
FIG. 3A is a schematic diagram of a virtual CCD surface coordinate system, showing a correspondence relationship between pixels of an output image transformed by a transformation table in Embodiment 1 and pixels of an input image.

As shown in FIG. 3A, among the pixels of an output image 41, for example, coordinates $(X_1, Y_1)$ of a point $P_1$ is represented by using polar coordinates of a radius $r_1$ and a phase angle $\psi_1$ as follows:

$$X_1 = r_1 \cdot \cos\psi_1 \quad (1)$$

$$Y_1 = r_1 \cdot \sin\psi_1 \quad (2)$$

Figure 3B:
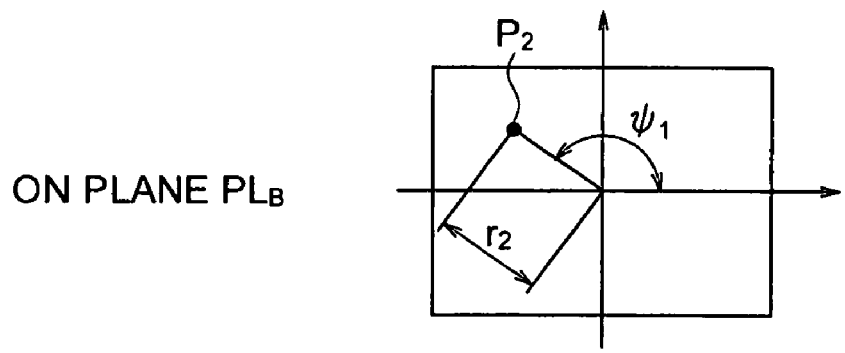
FIG. 3B is a schematic diagram of a plane $PL_B$, showing a correspondence relationship between pixels of an output image transformed by a transformation table in Embodiment 1 and pixels of an input image.
Figure 3C:
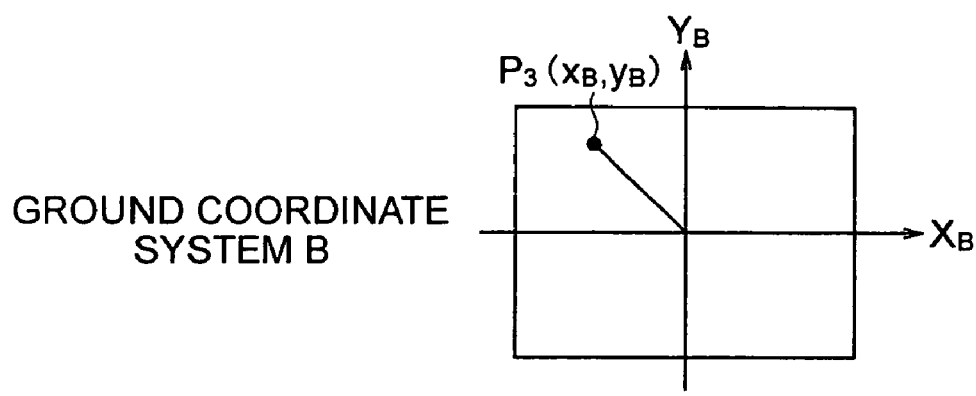
FIG. 3C is a schematic diagram of a ground coordinate system B, showing a correspondence relationship between pixels of an output image transformed by a transformation table in Embodiment 1 and pixels of an input image.

Next, regarding coordinates $(x_B, y_B)$ of a point $P_3$ on the ground coordinate system B shown in FIG. 3C, corresponding to the point $P_1$, the following equations hold.

$$r_1 = r_2 \cdot f/(L_B - f) = [X_B^2 + (y_B \cdot \sin\omega_2)^2]^{1/2} \cdot f/(y_B \cdot \cos\omega_2 + h_2/\sin\omega_2 - f) \quad (3)$$

$$\psi_1 = \tan^{-1}(y_B \cdot \sin\omega_2 / X_B) \quad (4)$$

where $L_B$: distance between the virtual camera position 31 and the plane $PL_B$ f: focal length of the lens 21

$r_2$: distance between a point $P_2$ (see FIG. 3B) obtained by projecting the point $P_3$ on the ground coordinate system B onto the plane $PL_B$ and the virtual camera optical axis.

From Equations (1) to (4), the coordinates $(x_B, y_B)$ of the point $P_3$ on the ground coordinate system B, corresponding to the point $P_1$ on the virtual CCD surface coordinate system are determined.

Figure 4A:
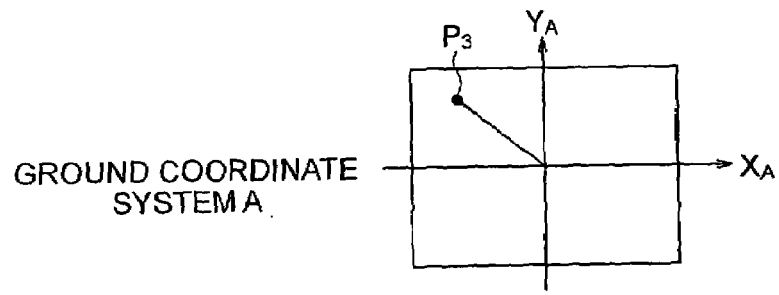
FIG. 4A is a schematic diagram of a ground coordinate system A, showing a correspondence relationship between pixels of an output image transformed by a transformation table in Embodiment 1 and pixels of an input image.

Second, coordinates $x_A, y_B$ on the ground coordinate system A as shown in FIG. 4A are determined with respect to the coordinates of the point $P_3$ on the ground coordinate system B (Step 2).

In this case, the $y_B$ coordinate of the point $P_3$ is shifted by a distance $\Delta y$ between the virtual camera optical axis center $O_B$ and the actual camera optical axis center $O_A$ on the ground 10, with respect to the coordinates of the point $P_3$ on the ground coordinate system A.

Herein, $\Delta y$ is represented by the following equation:

$$\Delta y = h_2/\tan\omega_2 - h_1/\tan\omega_1 \quad (5)$$

From Equation (5), the coordinates $(x_A, y_A)$ of the point $P_3$ on the ground coordinate system A are determined.

Figure 4B:
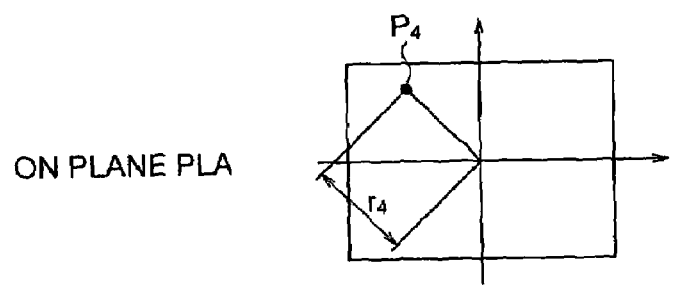
FIG. 4B is a schematic diagram of a plane $PL_A$, showing a correspondence relationship between pixels of an output image transformed by a transformation table in Embodiment 1 and pixels of an input image.
Figure 4C:
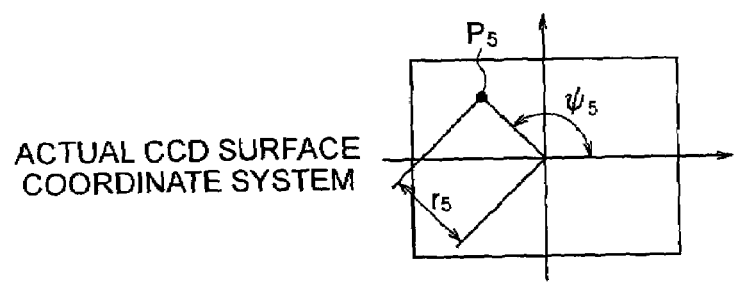
FIG. 4C is a schematic diagram of an actual CCD surface coordinate system, showing a correspondence relationship between pixels of an output image transformed by a transformation table in Embodiment 1 and pixels of an input image.

Third, regarding the coordinates of the point $P_3$ on the ground coordinate system A, coordinates of a point $P_5$ on the actual CCD surface coordinate system at the actual camera position 23 corresponding to the point $P_3$ as shown in FIG. 4C are determined (Step 3).

Between the coordinates $(x_A, y_A)$ of the point $P_3$ on the ground coordinate system A and the coordinates $(X_5, Y_5)$ of the point $P_5$ on the actual CCD surface coordinate system at the actual camera position 23 corresponding to the point $P_3$, the following equations hold, with polar coordinates of the point $P_5$ being $r_5, \psi_5$.

$$r_5 = r_4 \cdot f/(L_A - f) = [X_A^2 + (y_A \cdot \sin\omega_1)^2]^{1/2} \cdot f/(y_A \cdot \cos\omega_1 + h_1/\sin\omega_1 - f) \quad (6)$$

$$\psi_5 = \tan^{-1}(y_A \cdot \sin\omega_1 / X_A) \quad (7)$$

$$X_5 = r_5 \cdot \cos\psi_5 \quad (8)$$

$$Y_5 = r_5 \cdot \sin\psi_5 \quad (9)$$

where $L_A$: distance between the actual camera position 23 and the plane $PL_A$ f: focal length of the lens 21

$r_2$: distance between a point $P_4$ (see FIG. 4B) obtained by projecting the point $P_3$ on the ground coordinate system A onto the plane $PL_A$ and the actual camera optical axis.

From Equations (6) to (9), an $X_5$-coordinate and a $Y_5$-coordinate of the point $P_3$ on the ground coordinate system A are determined on the actual CCD surface coordinate system at the actual camera position 23.

Finally, coordinates of a point $P_6$ obtained by adding lens distortion to the point $P_5$ on the actual CCD surface coordinate system at the actual camera position 23 are determined (Step 4).

Figure 4D:
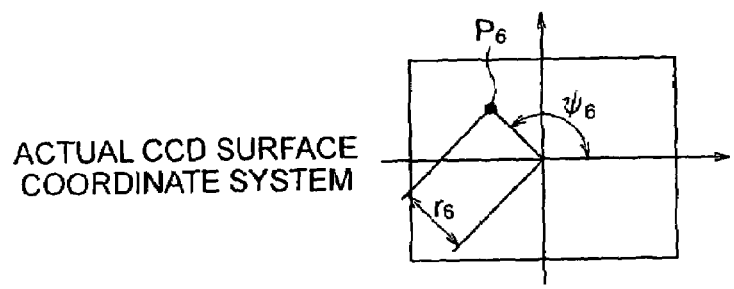
FIG. 4D is a schematic diagram of an actual CCD surface coordinate system, showing a correspondence relationship between pixels of an output image transformed by a transformation table in Embodiment 1 and pixels of an input image.

For obtaining an $X_6$-coordinate and a $Y_6$-coordinate of the point $P_6$, as shown in FIG. 4D, when the point $P_6$ is represented by polar coordinates $(r_6, \psi_6)$, the following equations for correcting lens distortion hold. According to the equation for correcting lens distortion, lens distortion correction of removing lens distortion is conducted by changing only the distance from the focal point of the lens 21 without changing the phase angles $\psi_5, \psi_6$.

$$a \cdot r_6^2 + (b - 100/r_5) \cdot r_6 + c + 100 = 0 \quad (10)$$

$$\psi_6 = \psi_5 \quad (11)$$

$$X_6 = r_6 \cdot \cos\psi_6 \quad (12)$$

$$Y_6 = r_6 \cdot \sin\psi_6 \quad (13)$$

where a, b, and c are correction coefficients; for example, a=−8.9, b=−1.4, and c=1.9 are used.

From Equations (10) to (13), the coordinates $(X_6, Y_6)$ of the point $P_6$ are determined in the case where lens distortion is added to the position of the point $P_5$ on the CCD surface coordinate system at the actual camera position.

A transformation table is created in accordance with the above-mentioned processing procedure, whereby the positional relationship is determined between the pixels represented by the virtual CCD surface coordinate system at the virtual camera position 31 in an output image to be displayed on the monitor 4 and the pixels of an input image.

Figure 5B:
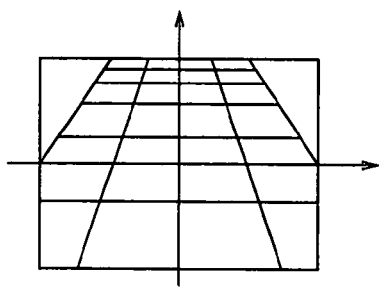
FIG. 5B is a schematic diagram illustrating the effects of image transformation of the image transformation apparatus of Embodiment 1, i.e., a diagram showing an image excluding lens distortion.
Figure 5C:
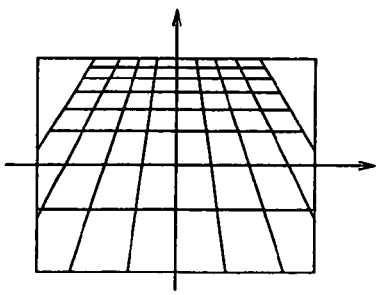
FIG. 5C is a schematic diagram illustrating the effects of image transformation of the image transformation apparatus of Embodiment 1, i.e., a diagram showing an output image at a virtual camera position.

More specifically, lens distortion is removed (see FIG. 5B) from the input image containing lens distortion shown in FIG. 5A, and thereafter, the input image is transformed into an output image assumed to be captured from the virtual camera position 31 as shown in FIG. 5C.

As described above, the controller 30 uses the above-mentioned transformation table to transform an input image captured by the camera 2 into an output image assumed to be obtained by three-dimensionally capturing the rear from the virtual camera position 31, and displays the image as shown in FIG. 5C on the monitor 4. Therefore, irrespective of the attachment position of the camera 2, a monitor image can be obtained at a camera position and a camera inclination at which a driver can easily obtain a view.

Furthermore, lens distortion is also removed by the transformation table, so that a natural image is obtained which is easy to be seen by human eyes as shown in FIG. 5C.

Furthermore, as shown in FIG. 5C, an input image can be transformed into an image at the virtual camera position 31 higher than the actual camera position 23. Therefore, an image with a wider field of view particularly in the right and left directions of the vehicle 1 can be obtained, with respect to an image at the actual camera position 23 with distortion corrected as shown in FIG. 5B.

The virtual camera position 31 may be set at a position shifted in the right or left direction of the vehicle with respect to the actual camera position 23. In this case, the coordinates should be moved on the ground coordinate system in the right or left direction of the vehicle in Step 2.

Embodiment 2

Figure 6:
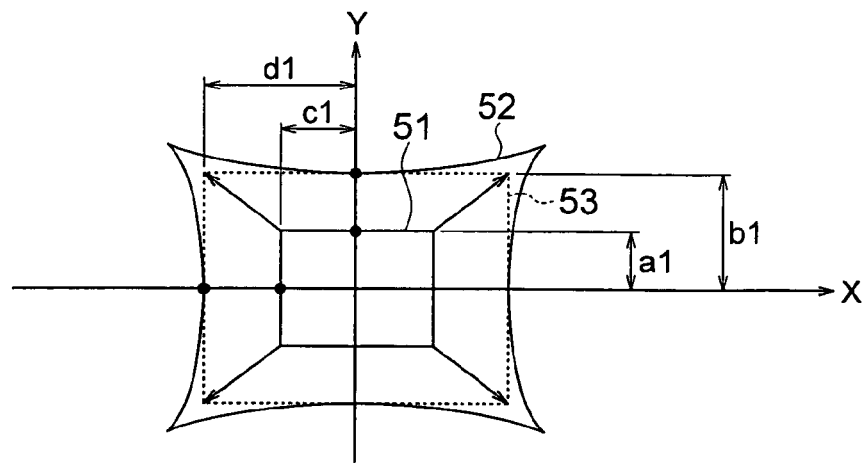
FIG. 6 is a schematic diagram illustrating image transformation of an image transformation apparatus of Embodiment 2.

In another embodiment of an image transformation apparatus according to the present invention, as shown in FIG. 6, in the case where the size of an output image 51 on a virtual CCD surface coordinate system at a virtual camera position is displayed in a small size on the monitor 4, and there is a room for a display region of the output image with respect to the size of an input image 52, the following processing is conducted between Steps 3 and 4 of creating the transformation table in Embodiment 1. Specifically, X and Y coordinates of input pixels are multiplied by d1/c1 and b1/a1, respectively, and allowed to correspond to the pixels of the output image on the virtual CCD surface coordinate system at the virtual camera position 31.

Because of the above, an output image 53 can be obtained, which is formed by magnifying the output image 51 by d1/c1 in the X-axis direction and by b1/a1 in the Y-axis direction. Accordingly, a monitor image can be obtained, which is easy for a driver to see.

Embodiment 3

Figure 7A:
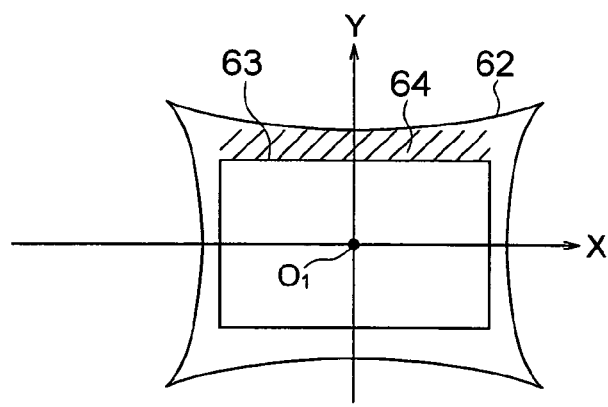
FIG. 7A is a schematic diagram illustrating image transformation of an image transformation apparatus of Embodiment 3, i.e., a schematic diagram before an origin position in a virtual CCD surface coordinate system is shifted.
Figure 7B:
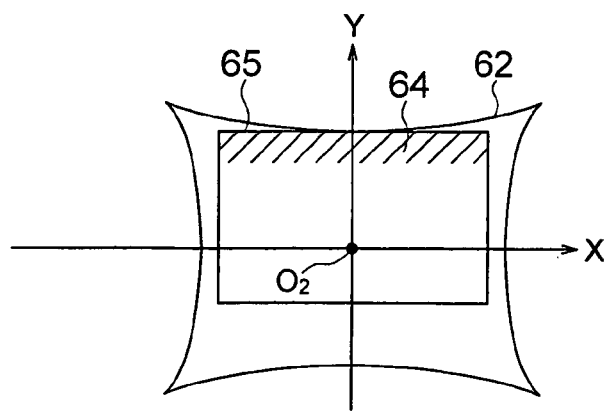
FIG. 7B is a schematic diagram after an origin position is shifted.

In another embodiment of the image transformation apparatus according to the present invention, as shown in FIG. 7A, before Step 1 of creating the transformation table in Embodiment 1, the origin position $O_1$ on the virtual CCD surface coordinate system at the virtual camera position is shifted to an origin position $O_2$ shown in FIG. 7B. Because of this, with respect to an output image 63 corresponding to an input image 62 before shifting the origin position $O_1$ as shown in FIG. 7A, an output image 65 after shifting the origin position $O_1$ to the origin position $O_2$ as shown in FIG. 7B includes a portion 64 (shaded portion in the figure) of a rear view away from the vehicle 1 of the input image 62.

Embodiment 4

Figure 8:
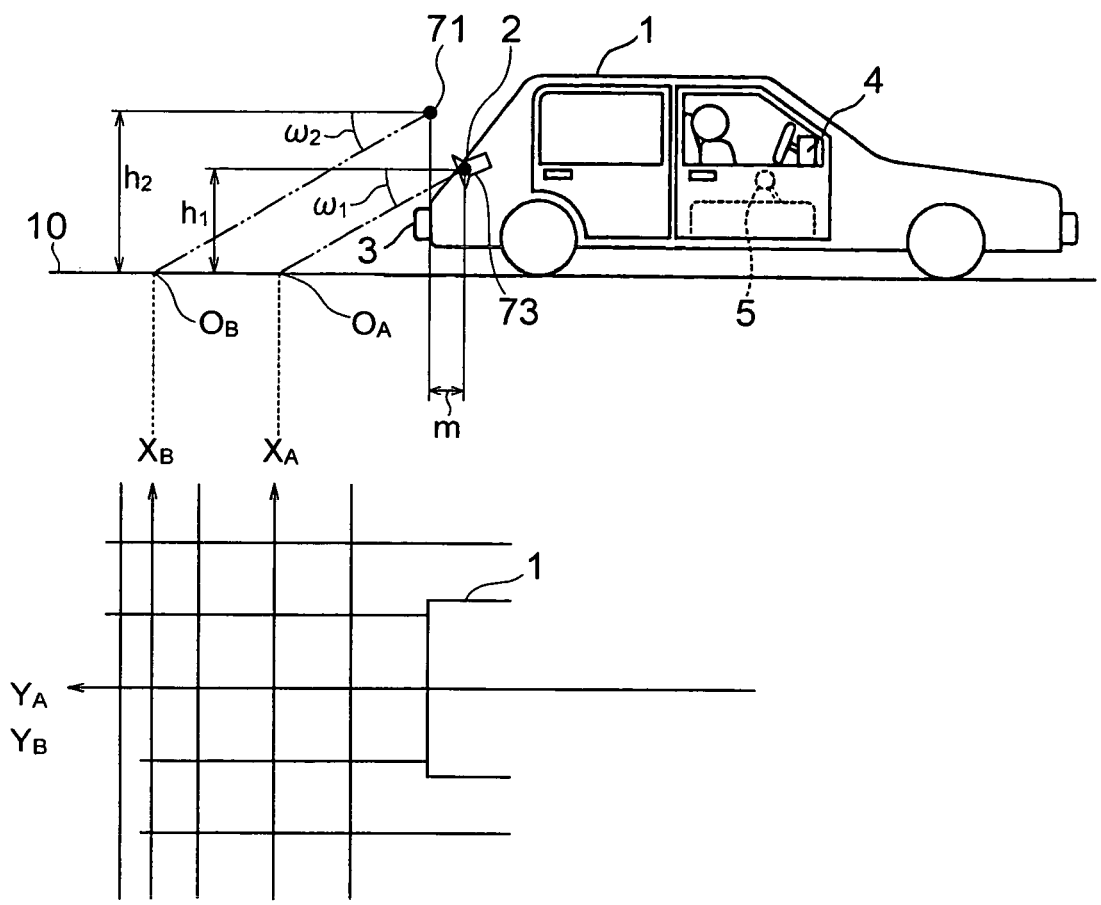
FIG. 8 is a diagram showing a vehicle equipped with an image transformation apparatus for a vehicle rear monitoring device of Embodiment 4 according to the present invention.

FIG. 8 shows a structure of the image transformation apparatus for a vehicle rear monitoring device of Embodiment 4 according to the present invention.

In the figure, a virtual camera position 71 is different from an actual camera position 73 not only in a height but also in a position in the front-to-back direction of the vehicle 1. Specifically, the virtual camera position 71 is shifted from the actual camera position 73 in the front-to-back direction of the vehicle 1 by a distance m.

Due to the shape of the vehicle 1, in the case where there is a limit to an attachment position of the camera 2, and the camera 2 cannot be attached to the back end of the vehicle 1, if the virtual camera position 71 is defined only by changing the height thereof with respect to the actual camera position 73, the proportion of the rear bumper 3 occupying an image to be displayed on the monitor 4 is increased; as a result, a sufficient rear view of the vehicle required for the vehicle to roll backward cannot be ensured. In this case, by previously creating a transformation table, it is possible to easily display an image that is obtained by capturing the rear at the virtual camera position different from the actual camera position.

Embodiment 5

Figure 9:
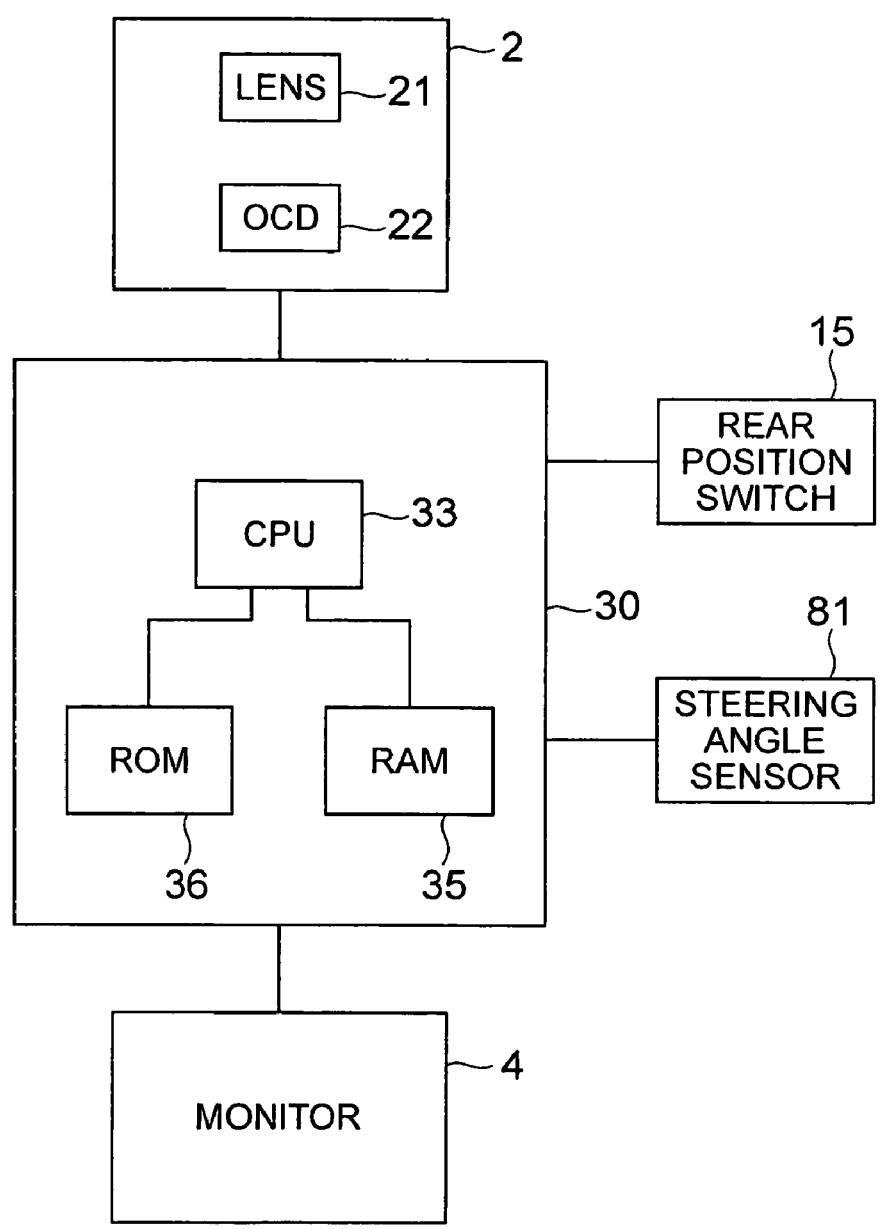
FIG. 9 is a block diagram showing a constitution of an image transformation apparatus of Embodiment 5.

FIG. 9 is a block diagram showing a constitution of the image transformation apparatus of Embodiment 5 according to the present invention. In the constitution of the image transformation apparatus, a steering angle sensor 81 is added to the apparatus of Embodiment 1 shown in FIG. 2, and a ROM 36 is provided in place of the ROM 34. The steering angle sensor 81 is used for detecting the steering angle of the steering wheel 16. The steering angle sensor 81 is attached to the steering wheel 16 of the vehicle 1 and connected to the controller 30.

The image transformation apparatus displays, on a screen of the monitor 4 shown in FIG. 9, the output image described in Embodiment 1, from which lens distortion is removed and which is assumed to be obtained by capturing the rear at a predetermined inclination at the virtual camera position 31 shown in FIG. 1, and also displays a guide display for the vehicle 1 to roll back and to be pull-in parked, in such a manner that the guide display is superimposed on the output image. The ROM 36 stores data for a guide display such as steering start guidelines 100 and 110, a steering amount guide mark 120, vehicle width guidelines 140, and a vehicle path guideline 130 shown in FIG. 10A. The steering start guidelines 100 and 110 are displayed at predetermined positions on the screen of the monitor 4 irrespective of steering the steering wheel 16, and are line segments showing appropriate steering start positions for pull-in-parking. The steering start guideline 100 is a steering start guideline for parking in the right backward direction. The steering start guideline 110 is a steering start guideline for parking in the left backward direction.

Furthermore, the steering amount guide mark 120 is, for example, a red circular mark, displayed on the monitor 4 by the CPU 33 along the steering start guideline 100 or 110, in accordance with the size of a steering angle of the steering wheel detected by the steering angle sensor 81. The steering amount guide mark 120 moves further downward on the screen of the monitor 4 as the steering angle of the steering wheel becomes larger, along the steering start guideline 100 in the case of steering the steering wheel 16 to the right and along the steering start guideline 110 in the case of steering the steering wheel 16 to the left.

Furthermore, a pair of right and left vehicle width guidelines 140 show expected positions of both sides of the vehicle 1 at a time when the vehicle is rolling back, and draw outer lines of a virtual planar projection pattern of the vehicle. The vehicle width guidelines 140 are displayed on the monitor 4 by the CPU 33, based on the data on the entire width of the vehicle 1 previously stored in the ROM 36. Furthermore, a line segment 141 in a lower part of the vehicle width guideline 140 is a bumper line showing the current position of the rear bumper 3 of the vehicle.

Furthermore, the vehicle path guideline 130 represented by a broken line is obtained as follows: an expected path of the vehicle 1 at a time when the vehicle rolls backward at a steering angle of the steering wheel detected by the steering angle sensor 81 is subjected to an arithmetic operation by the CPU 33 and displayed on the monitor 4. Both ends of line segments 131, 132, and 133 of the vehicle path guideline 130 show the positions of the rear bumper 3 when the vehicle 1 rolls backward by 1 m, 1.5 m, and 2.5 m from the current position of the rear bumper 3 on the road while the steering angle of the steering wheel at that time is maintained.

Figure 10A:
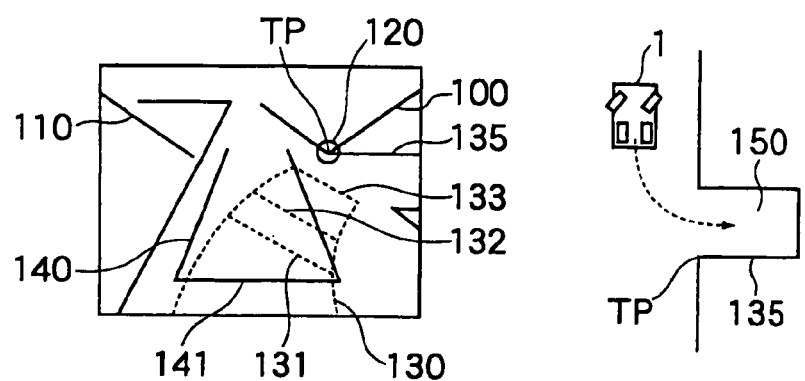
FIGS. 10A and 10B schematically show a vehicle position and a monitor screen at a time when the vehicle is being pull-in parked in a parking space by turning into the parking space (namely, when the vehicle is backed into the parking space by turning the steering wheel in one direction) as shown in Embodiment 5, i.e., a schematic diagram showing an output image with distortion corrected from a virtual camera position, having a guide display superimposed thereon.

Next, the function of the image transformation apparatus will be described with reference to FIGS. 10A and 10B by exemplifying the case where the vehicle 1 is pull-in parked in a parking space at the right backward direction of the vehicle.

First, a driver stops the vehicle when the vehicle is substantially at a right angle with respect to a parking space 150 at the rear of the vehicle, where the driver is attempting to park the vehicle, and the back end of the vehicle passes 2 to 3 m from the parking space 150. Then, the driver first visually confirms the safety at the rear of the vehicle and the positional relationship between the parking space 150 and the vehicle, and switches the shift lever 5 to the backward direction. At this time, as shown in FIG. 10A, due to switching of the shift lever 5, the steering start guidelines 100 and 110, the vehicle width guideline 140, and the vehicle path guideline 130 are displayed on the monitor 4 while being superimposed on the output image, based on the detection signal from the rear position switch 15.

The driver allows the vehicle 1 to roll backward in a straight line, and stops it when an target point TP, which is an end of a side parking frame 135 on the distant side of the parking space 150 from the vehicle, overlaps the steering start guideline 100. When the driver steers the steering wheel 16 while staying at the position, the steering amount guide mark 120 is displayed on the steering start guideline 100. As the driver steers the steering wheel 16, the steering amount guide mark moves downward along the steering start guideline 100. Then, the driver steers the steering wheel 16 until the steering amount guide mark 120 overlaps the target point TP. When the steering amount guide mark 120 overlaps the target point TP, the driver allows the vehicle to roll backward while keeping the steering wheel 16 at the steering angle. The vehicle 1 rolls backward while turning by about 90° with a predetermined vehicle turning radius, whereby the driver can appropriately place the vehicle 1 in the parking space 150 without minutely correcting the steering amount of the steering wheel.

Figure 10B:
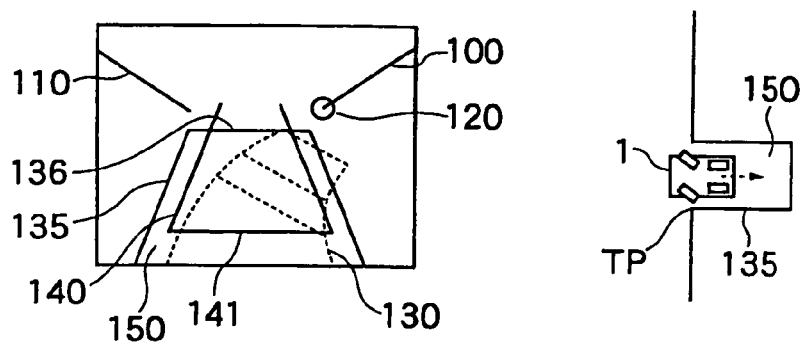

Next, as shown in FIG. 10B, the driver stops the vehicle 1 when the vehicle width guideline 140 becomes parallel to the side parking frame 135. The driver returns the steering wheel 16 to a straight traveling position, and starts allowing the vehicle 1 to slowly roll backward in a straight line. When an appropriate interval is obtained between a rear parking frame 136 and the line segment 141 of the bumper line of the vehicle width guideline 140, the driver stops the vehicle 1. Thus, pull-in-parking is completed.

The image transformation apparatus displays, on a screen of the monitor 4, the output image, from which lens distortion is removed and which is assumed to be obtained by capturing the rear at a predetermined inclination at the virtual camera position 31 shown in FIG. 1, and also displays a guide display for the vehicle 1 to roll back and to be pull-in parked, in such a manner that the guide display is superimposed on the output image. The virtual camera position 31 is placed at a higher position than the actual camera position 23, and in the output image assumed to be captured at the virtual camera position 31, a field of view at the rear of the vehicle is wide as shown in FIG. 10A.

Figure 10C:
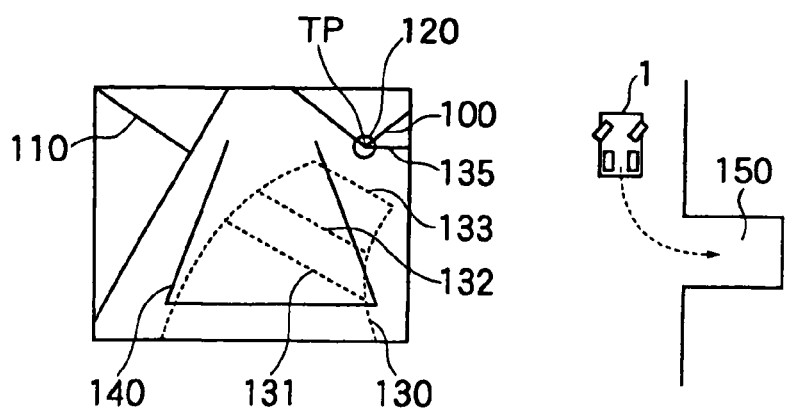
FIG. 10C schematically shows a vehicle position and a monitor screen at a time when the vehicle is being pull-in parked in Embodiment 5, i.e., a schematic diagram showing an image with distortion corrected from an actual camera position, having a guide display superimposed thereon.
Figure 11:
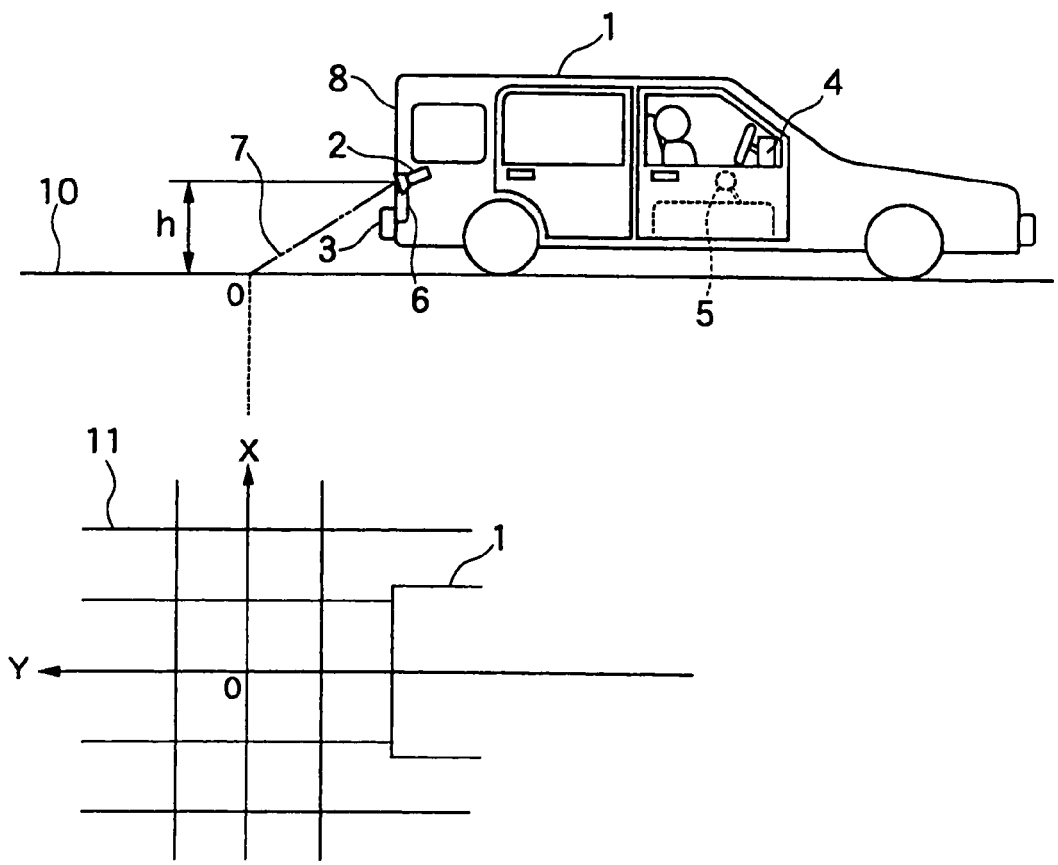
FIG. 11 shows a vehicle equipped with a conventional image processing apparatus for a vehicle rear monitoring device.
Figure 12:
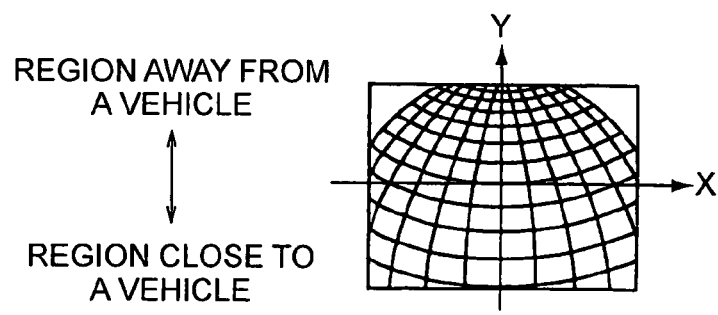
FIG. 12 is a diagram showing an input image containing lens distortion.

On the other hand, for reference, FIG. 10C shows the example in which a guide display is superimposed on the image at the actual camera position 23. In the image at the actual camera position 23, a field of view at the rear of the vehicle is narrow. More specifically, when the image in FIG. 10A is compared with that in FIG. 10C, in the image at the virtual camera position 31, a field of view at the rear of the vehicle is wider than that at the actual camera position 23.

Thus, when the guide display for supporting pull-in-parking is displayed while being superimposed on the output image at the virtual camera position 31, the driver can conduct pull-in-parking more easily.

Furthermore, as shown in FIG. 10B, the vehicle width guideline 140 is displayed while being superimposed on the output image. Therefore, a field of view on the periphery of the parking space 150 becomes wide, and it becomes easy to determine whether or not the side parking frame 135 of the parking space 150 is parallel to the vehicle width guideline 140. As a result, pull-in-parking can be conducted with safety and high precision.

Even in the case of parallel parking, by displaying an output image from which lens distortion is removed and which is assumed to be obtained by capturing the rear at a predetermined inclination at the virtual camera position, together with a guide display for supporting longitudinal parking, in such a manner that the guide display is superimposed on the output image, it is more easy for a driver to conduct longitudinal parking by utilizing the guide display based on the image at the rear of a vehicle with a wide field of view. Furthermore, it becomes easy to determine whether or not the side parking frame of a parking space in which the driver is attempting to conduct longitudinal parking is parallel to the vehicle 1.

What is claimed is:

1. An image transformation apparatus for a vehicle rear monitoring device, comprising:

a camera mounted on a vehicle for capturing a rear of the vehicle;

a monitor disposed at a driving seat of the vehicle; and display control means for transforming an input image that is an image captured by the camera at a time when the vehicle is rolling backward into an output image that is an image assumed to be obtained by capturing the rear at a predetermined inclination at a virtual camera position different from an actual camera position at which the camera is mounted, and displaying the output image on the monitor, wherein the display control means transforms the input image on the basis of the positional relationship between respective pixels of the output image to be displayed on the monitor and respective pixels of the input image corresponding to the output image by obtaining coordinates of input pixels corresponding to each output pixel, the display control means displays as each output pixel, the input pixels having the obtained coordinates, and the display control means comprises a transformation table including:

first transformation means for transforming a coordinate value represented on a virtual CCD surface coordinate system at the virtual camera position in the output image into a coordinate value on a ground coordinate system at the virtual camera position, second transformation means for transforming the coordinate value transformed into the coordinate value on the ground coordinate system at the virtual camera position into a coordinate value represented on the ground coordinate system at the actual camera position shifted only by an offset between a virtual camera optical axis center that is a center of an optical axis of the camera when the camera is assumed to be disposed at the virtual camera position and an actual camera optical axis center, third transformation means for transforming the coordinate value transformed into the coordinate value on the ground coordinate system at the actual camera position into a coordinate value represented on the actual CCD surface coordinate system at the actual camera position, and fourth transformation means for transforming the coordinate value transformed into the coordinate value on the actual CCD surface coordinate system into the coordinate value in the input image with lens distortion of the camera added thereto, and a positional relationship between respective pixels of the output image to be displayed on the monitor and respective pixels of the input image corresponding to the output image is determined based on the transformation table.

2. An image transformation apparatus for a vehicle rear monitoring device according to claim 1, wherein the display control means includes a function of moving a cut range of the output image with respect to the input image in a parallel direction.

3. An image transformation apparatus for a vehicle rear monitoring device according to claim 1, wherein the display control means enlarges a cut range of the output image with respect to the input image and transforms it into the output image.

4. An image transformation apparatus for a vehicle rear monitoring device according to claim 1, wherein the display control means transforms the input image into the output image from which lens distortion is removed.

5. An image transformation apparatus for a vehicle rear monitoring device according to claim 1, wherein the display control means transforms only the pixels of the input image whose positional relationship is determined based on the transformation table, among the pixels of the input image, based on the transformation table, and displays them on the monitor as an output image.

6. An image transformation apparatus for a vehicle rear monitoring device according to claim 1, wherein the display control means includes image cut range enlarging means for transforming the coordinate value represented on the actual CCD surface coordinate system at the actual camera position by the third transformation means, so as to enlarge a cut range of the output image with respect to the input image on the actual CCD surface, and transforms the coordinate value transformed by the image cut range enlarging means into a coordinate value of the input image with lens distortion of the camera added thereto by the fourth transformation means.

7. An image transformation apparatus for a vehicle rear monitoring device according to claim 1, wherein the display control means includes image moving means for transforming the coordinate value represented on the virtual CCD surface coordinate system at the virtual camera position in the output image into a coordinate value on a coordinate system that is obtained by moving an origin of the virtual CCD surface coordinate system, and transforms the coordinate value transformed by the image moving means into a coordinate value on the ground coordinate system at the virtual camera position by the first transformation means.

8. An image transformation apparatus for a vehicle rear monitoring device according to claim 1, wherein the display control means displays a guide display for supporting an operation of a vehicle when the vehicle rolls backward, in such a manner that the guide display is superimposed on the monitor.

9. An image transformation apparatus for a vehicle rear monitoring device according to claim 8, wherein the guide display is displayed at a predetermined position on a screen of the monitor, and includes a vehicle width guideline showing expected positions of both sides of the vehicle when the vehicle rolls backward in a straight line.

10. An image transformation apparatus for a vehicle rear monitoring device according to claim 8, comprising a steering angle sensor for detecting a steering angle of a steering wheel, wherein the guide display is displayed with movement on the screen of the monitor, and includes a steering path guideline of the vehicle showing an expected position of the vehicle when the vehicle rolls backward at the steering angle of the steering wheel detected by the steering angle sensor.

11. An image transformation apparatus for a vehicle rear monitoring device according to claim 8, comprising a steering angle sensor for detecting a steering angle of a steering wheel, wherein the guide display includes a steering start guideline that is displayed at a predetermined position on a screen of the monitor and made of a line segment for guiding an appropriate steering start position for parking and a steering amount guide mark that is displayed with movement along the steering start guideline on the screen of the monitor in accordance with a size of the steering angle of the steering wheel detected by the steering angle sensor.

* * * * *

UNITED STATES PATENT AND TRADEMARK OFFICE
CERTIFICATE OF CORRECTION

PATENT NO. : 6,985,171 B1 Page 1 of 1
DATED : January 10, 2006
INVENTOR(S) : Hisashi Kuriya et al.

It is certified that error appears in the above-identified patent and that said Letters Patent is hereby corrected as shown below:

<u>Column 5,</u>
Line 31, (equation 4), after "$X_B$" add -- ) --.

Signed and Sealed this

Twenty-third Day of May, 2006

JON W. DUDAS
*Director of the United States Patent and Trademark Office*